US005939613A

United States Patent [19]

Naaman et al.

[11] Patent Number: 5,939,613

[45] Date of Patent: Aug. 17, 1999

[54] LOW-VACUUM MASS SPECTROMETER

[75] Inventors: Ron Naaman, Ness-Ziona; Zeev Vager, Rehovot, both of Israel

[73] Assignee: Yeda Research and Development Co. Ltd., Rehovot, Israel

[21] Appl. No.: 09/068,152

[22] PCT Filed: Nov. 13, 1996

[86] PCT No.: PCT/IL96/00149

§ 371 Date: Jul. 29, 1998

§ 102(e) Date: Jul. 29, 1998

[87] PCT Pub. No.: WO97/18579

PCT Pub. Date: May 22, 1997

[30] Foreign Application Priority Data

Nov. 14, 1995 [IL] Israel ........................................ 115984

[51] Int. Cl.[6] ............................. G01N 30/02; E04G 3/00; H01J 31/00

[52] U.S. Cl. .......................... 73/23.37; 250/287; 313/400

[58] Field of Search ................................ 73/23.37, 24.02; 250/287, 282, 305; 313/400, 422, 103 CM

[56] References Cited

U.S. PATENT DOCUMENTS

| | | | |
|---|---|---|---|
| 4,482,836 | 11/1984 | Washington et al. | 313/104 |
| 5,189,301 | 2/1993 | Thekkadath . | |
| 5,591,969 | 1/1997 | Park et al. . | |
| 5,770,859 | 6/1998 | Bielawski | 250/287 |

*Primary Examiner*—Hezron Williams
*Assistant Examiner*—Jay L. Politzer
*Attorney, Agent, or Firm*—Pillsbury Madison & Sutro LLP

[57] ABSTRACT

The invention provides a low-vacuum mass specrometer for use as gas analyzer, including a drift tube having a gas inlet and an ionization region at one end thereof, a power source for supplying the required high tension, a vacuum pump connectable to the drift tube to maintain a level of vacuum of up to 1 Torr, and a detector located at the other end of the drift tube, wherein the detector is a multisphere plate comprised of a multilayer arrangement of beads bonded together in a substantially close-packing order.

7 Claims, 1 Drawing Sheet

LOW-VACUUM MASS SPECTROMETER

FIELD OF THE INVENTION

The present invention relates to a low-vacuum mass spectrometer, for use as a gas analyzer.

BACKGROUND OF THE INVENTION

There exist two types of gas analyzers. The first and most commonly used is a mass spectrometer (MS). In the MS, a sample of material is ionized, accelerated by an electric field in a vacuum of about $10^{-6}$ Torr, mass-selected and than detected by a charge detector (e.g., Faraday cap, electron multiplier or microchannel plate). The high vacuum is essential for the operation of MSs of any type. Recently, MSs were modified to include atmospheric pressure ionization capability. In these devices, a pressure transducer is used to reduce the pressure as the ions accelerate towards the detector.

A second type of gas analyzer is the Ion Mobility Spectrometer (IMS). In the IMS, a sample is ionized and is drifted inside a tube kept at a pressure of about 1 atm. The interaction of the ions with the gas in the tube determines its time of arrival at the charge detector. In this device, the charge detector is bound to be a Faraday cap, since no other charge detector can operate at atmospheric pressure.

Due to the high vacuum requirements, the MS is typically a large system operating with expensive and large vacuum pumps. The data obtained is based on the mass of the ions arriving at the detector. In order to achieve better analytical capability, the MS is sometimes coupled to gas chromatography (GC). In this case, the affinity between the analyzed gases and the material in the columns of the GC serves for achieving better analytical capability.

Unlike the MS, the IMS is compact in size and easy to operate. Its operation at atmospheric pressure makes it inexpensive. Two main problems, however, exist in attempting to use it as a widely used analytical tool. Since it works at atmospheric pressure, the results are difficult to reproduce from place to place and from time to time. This is due to the different pressure depending on height above sea level and weather conditions. A second severe drawback is the limited dynamic range. Since the ions are produced at low velocity, space charge limits the number of ions that can be created within the ionizing volume. This is the upper limit on signals that can be obtained. The low sensitivity of the Faraday cap used as the detector puts a lower limit on the number of ions that must be produced for a signal to become measurable. It has been established that, as a result from these two limits, the dynamic range typical for IMS is about 50, much too low for many analytical applications.

It is thus one of the objects of the present invention to overcome the limits and drawbacks of existing gas analyzers by combining the dynamic range and sensitivity typical of the MS, and the ease of operation and low cost characteristic of the IMS.

SUMMARY OF THE INVENTION

According to the invention, this is achieved by providing a low-vacuum mass spectrometer for use as gas analyzer, comprising a drift tube having a gas inlet and an ionization region at one end thereof, a power source for supplying the required high tension, a vacuum pump connectable to said drift tube to maintain a level of vacuum of up to 1 Torr, and a detector located at the other end of said drift tube, wherein said detector is a multisphere plate comprised of a multilayer arrangement of beads bonded together in a substantially close-packing order.

In the present device, the gas to be analyzed is introduced into the ionizing area. It is ionized in a small volume by an ionizer means, such as an electron beam, a radioactive source or a laser. A voltage is applied to a drift tube, through which the ions are moving towards the detector. The drift tube is filled with gas up to a pressure of about 0.1 Torr. While drifting through the tube, the ions can either collide with the gas, whereby their velocity will be reduced, or they can actually react with the gas to form new ions. Passing along the drift tube, the ions impinge on a microsphere plate (MSP) detector which is capable of operating at these low vacuum conditions. The MSP multiplies the signal by several orders of magnitude. The time of flight between the instance of ionization and the instance of arrival at the detector can be measured with high precision, typically better than within 10 nanoseconds. It is the time-of-flight pattern that serves as a fingerprint of the analyzed molecules.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard. no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF PREFERRED EMBODIMENTS

Figure 1:
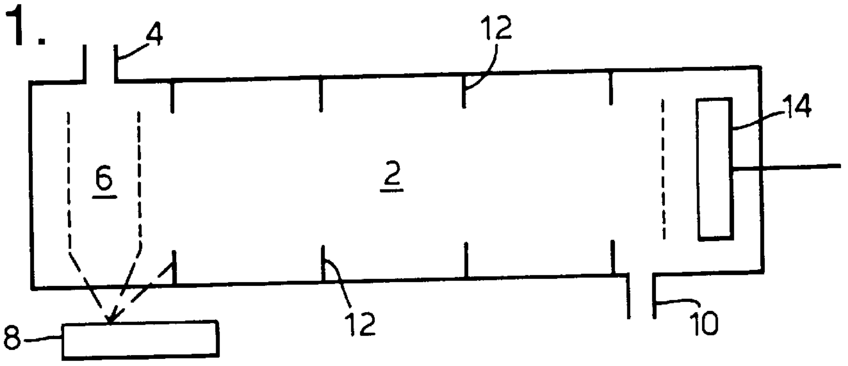
FIG. 1 is a schematic representation of the low-vacuum mass spectrometer (LVMS) according to the invention.

Referring now to the drawings, there is seen in FIG. 1 a schematic representation of the LVMS according to the invention, comprising a drift tube 2 having a gas inlet 4, an ionization region 6, a power source 8 supplying the required high voltage, a connector 10 to a small vacuum pump, several acceleration electrodes 12 (which are optional), and a detector 14 to be described further below.

The sample to be analyzed is introduced into ionization region 6 via inlet 4 in the form of gaseous-phase molecules. Another type of samples is also possible, similarly to what is used in M.S. In region 6, the sampled molecules are ionized by a short pulse of particles or photons. Power source 8 provides a field which accelerates the ions formed in ionization region 6 through drift tube 2, towards detector 14. Typically, a voltage of a few keV is applied, with ionization region 6 biased positively relative to the surface of detector 14. Drift tube 2 can have different lengths, depending on the specific application. Typically, its length is between 10 to 100 cm. It can be filled by different gases that serve either as colliders with the sampled ions or as reactants. The pressure in drift tube 2 might be different than that prevailing near the detector and is kept at the desired value by a small pump.

Figure 2:
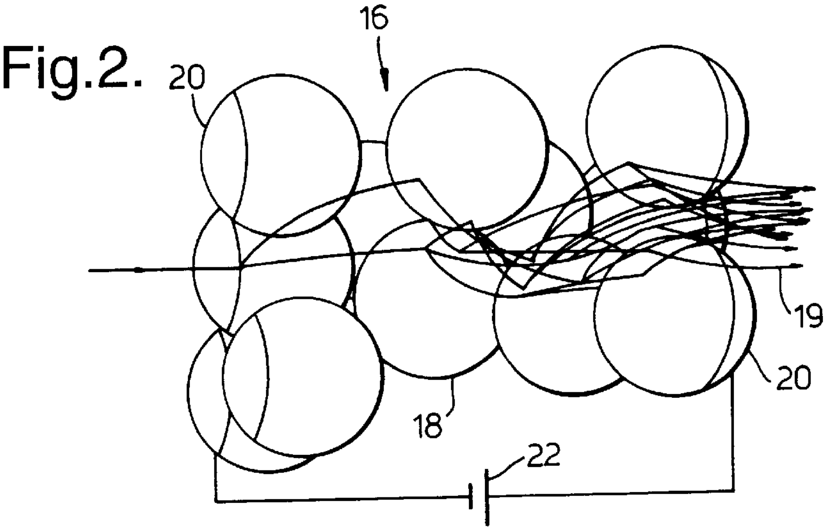
FIG. 2 shows, to a highly enlarged scale, a section of the microsphere plate (MSP) that serves as the detector in the LVMS.

Detector 14, a section of which is illustrated in FIG. 2, is in the form of a microsphere plate (MSP) 16, comprising a multilayer arrangement of spherical beads 18, advantageously made of glass, which provide secondary emissions 19 when impinged upon by elecrons or other charged particles. When beads 18 are sintered together, a tortuous path is formed between them. MSP 16, which serves in fact as an electron multiplier is configured so that the mean free path of the electrons at the operational pressure prevailing will be larger than the distance the electrons have to before colliding with a surface inside MSP 16. The average space d required between beads 18 depends on the working pressure P, the relation being $10^{-2}/P$, with P in mbar and d in centimeters. Hence, for close packing of spherical beads 18, the latter have to have diameters of the order of d. The microsphere plate 16 for a typical LVMS is of a thickness of about 0.7 mm and consists of glass beads of a diameter of about 70 mm. The outermost layers 20 are provided with metal coats for application of high voltage from a power source 22. A detector of the abovedescribed type is capable of working at pressures of up to about 1 Torr.

The above-mentioned tortuous path prevents ion feedback inside detector 14, while close packing of spherical beads 18 reduces the distance the electron has to travel within detector 14 before encountering a bead surface. It is these two characteristics of MSP 16 acting as detector 14, that enable the arrangement to operate at a low vacuum.

Figure 3:
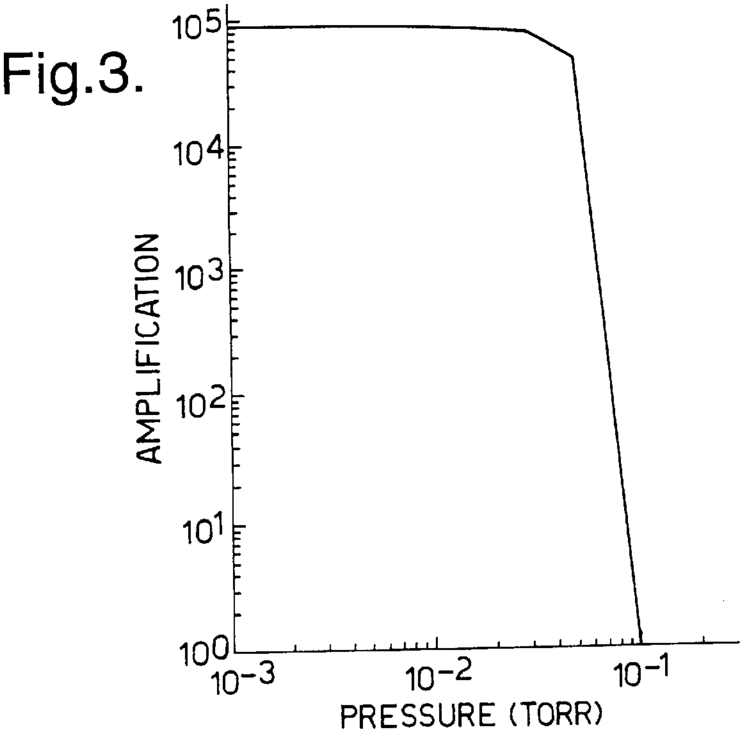
FIG. 3 is a graph, showing the amplification of the MSP as a function of pressure.

FIG. 3 is a graph illustrating the dependence of the amplification of the MSP on pressure. It is seen that amplification rises steeply at pressures lower than $10^{-1}$ Torr, to level off, starting from about $10^{-1.5}$ Torr, being about $10^5$ for a pressure of $10^{-3}$ Torr.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A low-vacuum mass spectrometer for use as gas analyzer, comprising:

a drift tube having a gas inlet and an ionization region at one end thereof;

a power source for supplying the required high tension;

a vacuum pump connectable to said drift tube to maintain a level of vacuum of up to 1 Torr, and a detector located at the other end of said drift tube, wherein said detector is a multisphere plate comprised of a multilayer arrangement of beads bonded together in a substantially close-packing order.

2. The mass spectrometer as claimed in claim 1, further comprising acceleration electrodes spaced along the inside of said drift tube.

3. In a low-vacuum mass spectrometer, an improvement in the form of a detector consisting of a multilayer plate comprised of a multilayer arrangement of beads banded together in a close-packing order, the bead diameter D of said beads depending on the pressure P prevailing in said drift tube, with D≈d, according to the relationship $10^{-2}/P$, where d is the average space between said beads and P is the pressure.

4. The mass spectrometer as claimed in claim 3, wherein said beads are spherical.

5. The mass spectrometer as claimed in claim 3, wherein said beads are mutually bonded by sintering.

6. The mass spectrometer as claimed in claim 3, wherein at least some of the beads of the outer layers of said microsphere plate are provided with an electrically conductive coat over at least part of their surface, to facilitate application of high tension.

7. The mass spectrometer as claimed in claim 3, wherein the pressure prevailing in said drift tube is up to 1 Torr.

* * * * *